United States Patent
Cohen et al.

(10) Patent No.: US 7,616,684 B2
(45) Date of Patent: Nov. 10, 2009

(54) RECEIVER WITH DECISION-DIRECTED EQUALIZER

(75) Inventors: Yossef Cohen, Nesher (IL); Noam Galperin, Maalot (IL); Ronen Even-Zur, Givaat-Ada (IL)

(73) Assignee: Zoran Corporation, Sunnyvale, CA (US)

( * ) Notice: Subject to any disclaimer, the term of this patent is extended or adjusted under 35 U.S.C. 154(b) by 558 days.

(21) Appl. No.: 11/392,302

(22) Filed: Mar. 28, 2006

(65) Prior Publication Data

US 2006/0220725 A1 Oct. 5, 2006

Related U.S. Application Data

(60) Provisional application No. 60/665,829, filed on Mar. 29, 2005.

(51) Int. Cl.
*H03H 7/30* (2006.01)
*H04B 3/14* (2006.01)
(52) U.S. Cl. .............. 375/232; 375/229; 333/28 R
(58) Field of Classification Search ............. 373/232, 373/229, 233, 315; 455/164.1, 164.2; 333/28 R; 708/322, 323
See application file for complete search history.

(56) References Cited

U.S. PATENT DOCUMENTS 5,533,070 A 7/1996 Krishnamurthy et al. .... 375/346

6,535,553 B1 * 3/2003 Limberg et al. ............. 375/232
7,236,757 B2 * 6/2007 Raghavan et al. ........... 455/203

FOREIGN PATENT DOCUMENTS

WO WO 00/27066 5/2000

OTHER PUBLICATIONS

International Search Report for International Application No. PCT/US2006/012348, mailed Aug. 3, 2006.

* cited by examiner

*Primary Examiner*—Khai Tran
(74) *Attorney, Agent, or Firm*—Morgan, Lewis & Bockius LLP

(57) ABSTRACT

A circuit is configured to receive and process a signal that includes in-phase and out-of-phase components that correspond to in-phase and out-of-phase components of a time sequence of symbols. A phase sensor in the circuit is configured to determine a phase value in accordance with an equalized version of the in-phase component of the signal and the in-phase component of the time sequence of symbols. The phase sensor is further configured to generate an approximation to the out-of-phase component of the signal in accordance with a Hilbert function of order k greater than 1. Terms in the approximation that correspond to future samples of the in-phase component of the signal are replaced with terms that correspond to past samples of an error that corresponds to a difference between samples of the in-phase component of the signal and an output from a detector.

23 Claims, 5 Drawing Sheets

RECEIVER WITH DECISION-DIRECTED EQUALIZER

RELATED APPLICATIONS

This application claims priority to U.S. Provisional Patent Application 60/665,829, filed Mar. 29, 2005, entitled "A Post-Equalizer VSB Decision-Directed Phase Sensor," which is hereby incorporated by reference in its entirety.

FIELD

The subject matter disclosed herein relates generally to receiver circuits, and in particular, to receiver circuits that include a decision-directed equalizer.

BACKGROUND

Receivers of signals often include carrier, timing and/or phase recovery loops. A carrier recovery loop may be used to demodulate signals from a carrier frequency to a lower frequency, such as baseband. A timing recovery loop may be used to synchronize the sampling of received signals. In many devices, a phase sensing loop is used to correct phase offsets. These receiver elements or components are often useful in recovering coherently modulated signals.

One type of coherent modulation is vestigial side band (VSB) modulation in which modulated quadrature signals corresponding to data symbols are transmitted. In theory, receivers of VSB modulated signals use a Hilbert pulse to penetrate or modulate the received signals. In typical receivers, approximations to the Hilbert pulse are implemented to simplify receiver design and reduce expense. These approximations to the Hilbert pulse are often implemented as a filter in a phase sensing and correction loop.

These existing approximations to the Hilbert pulse are often based on the assumption that only phase interference is present in a communications channel between a transmitter and a receiver. Such approaches, however, may offer degraded performance, such as an increased bit error rate, when the received signals include echo signals (for example, multi-path signals). In addition, the existing approximations to the Hilbert pulse are often based on future samples of at least a portion of the received signals. As a consequence, circuits that implement these approximations often have additional time delays, which impact recovery loop stability and increase circuit expense.

There is a need, therefore, for improved receivers for receiving modulated signals that have reduced delays and offer improved performance in the presence of echo signals.

SUMMARY OF THE INVENTION

A receiver circuit includes a demodulator configured to receive a signal, including an in-phase component of the signal that corresponds to an in-phase component of a time sequence of symbols and an out-of-phase component of the signal that corresponds to an out-of-phase component of the time sequence of symbols. The demodulator is further configured to output a first equalized version of the in-phase component of the signal in accordance with a first phase value. An equalizer is coupled to the demodulator. The equalizer is configured to determine a second equalized version of the in-phase component of the signal in accordance with a second phase value and to determine the in-phase component of the time sequence of symbols. A first phase sensor is coupled to the equalizer.

The first phase sensor is configured to determine the second phase value in accordance with the second equalized version of the in-phase component of the signal and the in-phase component of the time sequence of symbols. The first phase sensor is further configured to generate an approximation to the out-of-phase component of the signal in accordance with a Hilbert function of order k greater than 1. Terms in the approximation to the out-of-phase component of the signal that correspond to future samples of the in-phase component of the signal are replaced with terms that correspond to past samples of an error that corresponds to a difference between samples of the in-phase component of the signal and an output from a detector.

The second phase value may be determined in accordance with a difference between the second equalized version of the in-phase component of the signal and a corresponding detector output.

The approximation to the out-of-phase component of the signal may be generated in accordance with $$A_1[I_{er}(n-1)I_{eq}(n)-I_{er}(n)I_{eq}(n-1)]+A_3[I_{er}(n-3)I_{eq}(n)-I_{er}(n)I_{eq}(n-3)]+A_5[I_{er}(n-5)I_{eq}(n)-I_{er}(n)I_{eq}(n-5)]+A_7[I_{er}(n-7)I_{eq}(n)-I_{er}(n)I_{eq}(n-7)],$$

wherein $I_{eq}(n)$ is the nth sample of the in-phase component of the signal, $A_{2n-1}$ is a coefficient, $I_{er}(n)=I(n)-D\{I(n)\}$, and $D\{I(n)\}$ is a detector output.

A magnitude of a phase difference between the out-of-phase component of the signal and the in-phase component of the signal may be approximately 90°, in which case the out-of-phase component may be called a quadrature component of the signal.

The signal may include one or more multi-path signals. The signal may be vestigial side band (VSB) modulated.

In some embodiments, the demodulator is further configured to output a first equalized version of the out-of-phase component of the signal in accordance with the first phase value. In some embodiments, the circuit further includes a second phase sensor configured to determine the first phase value in accordance with the first equalized version of the in-phase component of the signal.

In some embodiments, the equalizer is configured to determine the in-phase component of the time sequence of symbols using decision feedback equalization and a maximum likelihood detector. In some embodiments, the phase sensor is further configured to generate a signum function of the second equalized version of the in-phase component of the signal.

In another embodiment, a circuit includes a demodulator configured to receive a signal, including an in-phase component of the signal that corresponds to an in-phase component of a time sequence of symbols and an out-of-phase component of the signal that corresponds to an out-of-phase component of the time sequence of symbols. The demodulator is further configured to output a first equalized version of the in-phase component of the signal in accordance with a phase value. An equalizer is coupled to the demodulator. The equalizer is configured to determine a second equalized version of the in-phase component of the signal and to determine the in-phase component of the time sequence of symbols. A phase sensor is coupled to the equalizer.

The phase sensor is configured to determine the phase value in accordance with the second equalized version of the in-phase component of the signal and the in-phase component of the time sequence of symbols. The first phase sensor is further configured to generate an approximation to the out-of-phase component of the signal in accordance with a Hilbert function of order k greater than 1. Terms in the approximation to the out-of-phase component of the signal that correspond to future samples of the in-phase component of the signal are replaced with terms that correspond to past samples of an error that corresponds to a difference between samples of the in-phase component of the signal and an output from a detector.

In another embodiment, a receiver circuit includes a digital filter. The digital filter is to filter a signal having in-phase and out-of-phase components in accordance with an approximation of a Hilbert function of order k greater than 1 to generate an approximation the out-of-phase component of the signal based on the in-phase component. Terms in the approximation that correspond to future samples of the in-phase component of the signal are replaced with terms that correspond to past samples of an error that corresponds to a difference between samples of the in-phase component of the signal and an output from a detector.

The challenges associated with existing receivers are at least in part addressed by the aforementioned embodiments of a receiver and associated embodiments of methods.

BRIEF DESCRIPTION OF THE DRAWINGS

For a better understanding, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
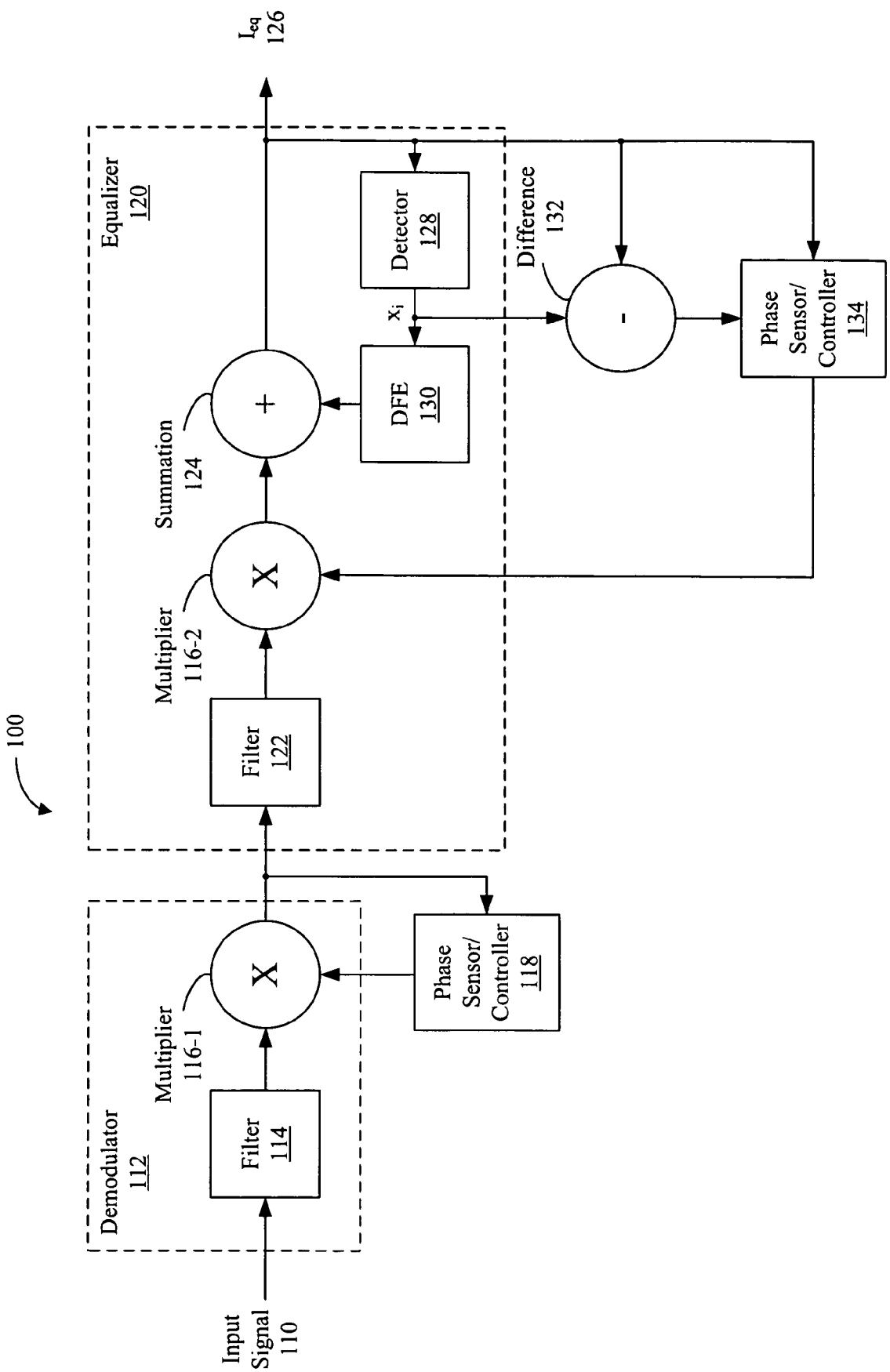
FIG. 1 is a block diagram illustrating an embodiment of a receiver.

Reference will now be made in detail to embodiments, examples of which are illustrated in the accompanying drawings. In the following detailed description, numerous specific details are set forth in order to provide a thorough understanding of the subject matter presented herein. However, it will be apparent to one of ordinary skill in the art that the subject matter may be practiced without these specific details. In other instances, well-known methods, procedures, components, and circuits have not been described in detail so as not to unnecessarily obscure aspects of the embodiments.

As described in more detail below, a receiver includes a phase sensor that implements embodiments of improved approximations to a Hilbert pulse or function for use in receiving modulated signals. These approximations are used to generate an out-of-phase component of a time sequence of symbols. Terms in the approximation to the out-of-phase component of the signal that correspond to future samples of the in-phase component of the signal are replaced with terms that correspond to past samples of an error that corresponds to a difference between samples of the in-phase component of the signal and an output from a detector. In some embodiments, the detector is a threshold detector. In some embodiments, the detector is a maximum likelihood detector, such as a Viterbi detector.

The receiver may be able to receive digital video and/or audio data. The data may be compatible with standards such as Nation Television Systems Committee (NTSC), Phase Alternating Line (PAL), Sequential Color and Memory (SECAM), High Definition Television (HDTV), Advanced Television Standards Committee (ATSC), High Definition Multi-Media Interface (HDMI), and/or one or more Motion Picture Experts Group (MPEG) encoding standards. In some embodiments, the receiver may also be able to receive input data that are compatible with a Universal Serial Bus (USB) standard (such as USB 2.0) and/or an IEEE 1394 standard (also known as Firewire). In some embodiments, the receiver may be able to receive signals that are modulated using vestigial side band (VSB) modulation, such as 8-VSB.

Attention is now directed towards modulated signals that may be received using embodiments of the receiver. VSB modulated signals are used as an illustrative embodiment in this discussion. It should be understood, however, that the receiver may be able to receive signals that are modulated using this and/or other modulation techniques.

In VSB modulation, a transmit signal may be generated from an in-phase component of a time sequence of symbols (i.e., an in-phase component of the original data) $x_i$ and an out-of-phase component of the time sequence of symbols $x_q$ using $$(x_i + jx_q)e^{j\theta},$$

where $\theta$ is a carrier-phase offset. A receiver may receive a VSB modulated receive signal that corresponds to the transmit signal. The receive signal may include an in-phase component I and an out-of-phase component Q, i.e., $$I + jQ.$$

In the absence of noise and interference signals (such as multi-path signals) in a communications channel linking a transmitter and a receiver, the transmit signal and the receive signal are closely related, i.e., $$I + jQ = (x_i + jx_q)e^{j\theta}.$$

In practical systems, a detector in the receiver may be used to determine at least the in-phase component of a time sequence of symbols $x_i$ using at least a portion of the receive signal. As illustrated in the preceding expressions, in some embodiments there is a quadrature phase relationship (i.e., approximately 90°) between the in-phase and out-of-phase components of the receive signal (henceforth referred to as the signal), as well as between the in-phase and out-of-phase components of the time sequence of symbols. A quadrature phase relationship is used as an illustrative embodiment in the following discussion.

A constellation error may be defined as $$I_{er} + jQ_{er} = (I+jQ) - (x_i + jx_q) = (I+jQ) - (I+jQ)e^{j\theta} = (I+jQ)(1 - e^{j\theta}),$$

where $I_{er}(n) = I(n) - x_i(n)$ and $Q_{er}(n) = Q(n) - x_q(n)$. Rearranging yields $$(I_{er} + jQ_{er})(I - jQ) = (I^2 + Q^2)(1 - e^{j\theta}).$$

Therefore, an exact expression for $\sin(\theta)$ is $$\sin(\theta) = K(Q_{er}I - I_{er}Q),$$

where $K = (I^2 + Q^2)^{-1} = (x_i^2 + x_q^2)^{-1}$. As a consequence, a phase sensor for a QAM signal is $$Q_{er}I - I_{er}Q, \quad (1)$$

To evaluate this expression, approximations of $I_{er}$ and $Q_{er}$ may be used, such as $I_{er} = I - D\{I\}$ and $Q_{er} = Q - D\{Q\}$, and D{ } is an output from a detector (i.e., the detector decisions). In an exemplary embodiment, the detector is a bit-by-bit threshold detector and $I_{er}(n)=I(n)-\text{slicer}\{I(n)\}$ and $Q_{er}(n)=Q(n)-\text{slicer}\{Q(n)\}$, where n is the nth sample in a sequence of samples. In another embodiment, the detector is a maximum likelihood detector, such as a Viterbi detector.

In VSB modulation, the in-phase component of the time sequence of symbols $x_i$ is the data and the out-of-phase or quadrature component of the time sequence of symbols $x_q$ may be obtained from $x_i$ using Hilbert filtering. In particular, $$x_q = \text{Hilbert}\{x_i\} = \frac{2}{\pi} \sum_{k=1,3,5,7...} h_k \cdot (x_i(n-k) - x_i(n+k)),$$

where $h_k=1/k$. In many existing receivers for VSB modulated signals, only in-phase decisions are made, i.e., a detector in the receiver only outputs $x_i$. As a consequence, only a portion of the phase sensor defined in Equation 1 is implemented in conjunction with additional averaging E{ }, i.e., $$E\{-I_{er}Q\}. \tag{2}$$

This approximation to the phase sensor is often justified using the following explanation. Assuming correct decisions for $x_i$, Equation 2 yields $-I_{er}Q = -(I-x_i)Q = -(x_i\cos\theta - x_q\sin\theta - x_i)(x_i\sin\theta + x_q\cos\theta) = -0.5x_i^2\sin 2\theta + x_ix_q\sin^2\theta + x_i^2\sin\theta - x_ix_q\cos^2\theta + 0.5x_q^2\sin 2\theta + x_ix_q\cos\theta.$ For VSB modulated signals, $x_q = \text{Hilbert}\{x_i\} \neq f(x_i)$. Thus, $E\{x_ix_q\}=0$. In addition, $E\{x_i^2\}=E\{x_q^2\}$. Therefore, $E\{-I_{er}Q\} = E\{x_i^2 \sin\theta\} = E\{x_i^2\}\sin\theta.$ This analysis indicates that Equation 2 is, in fact, an average phase sensor.

The preceding analysis, however, assumes that only phase interference is presented. If the received signals include echo signals (such as one or more multi-path signals) in addition to phase interference, a phase sensor based on Equation 2 may be applied after an equalizer in the receiver. In this case, $I=I_{eq}$ and $Q=Q_{eq}$. If $I_{eq}$ and $Q_{eq}$ are almost free of echo signals and thus contain only the phase interference as described previously, then $I_{eq} + jQ_{eq} \approx (x_i + jx_q)e^{j\theta}.$ In this case, the equation for the phase sensor is $$E\{-I_{er}Q_{eq}\}. \tag{3}$$

One way to obtain $Q_{eq}$ is to utilize a full complex implementation of an equalizer. In some receivers, however, IIR equalization is performed only on the in-phase component of the signal and $Q_{eq}$ is not available. An alternative is provided by the Hilbert filtering relationship between $x_q$ and $x_i$. In particular, since $x_q = \text{Hilbert}\{x_i\}$, $Q_{eq} \approx \text{Hilbert}\{I_{eq}\}$, or $$Q_{eq} = \frac{2}{\pi} \sum_{k=1,3,5,7...} h_k \cdot (I_{eq}(n-k) - I_{eq}(n+k)). \tag{4}$$

While it is therefore possible to generate $Q_{eq}$ by performing Hilbert filtering of $I_{eq}$, a phase sensor based on Equation 4 has a delay associated with the Hilbert filter. This delay may limit the a bandwidth of the phase recovery loop and may cause performance degradation.

An approximation to $Q_{eq}$ may be implemented by taking the first term in the series defined in Equation 4, which yields $$Q_{eq} = \frac{2}{\pi}(I_{eq}(n-1) - I_{eq}(n+1)).$$

The phase sensor in Equation 3 may then be approximated as $$E\left\{-I_{er}(n)\begin{bmatrix} I_{eq}(n-1) - \\ I_{eq}(n+1) \end{bmatrix}\right\} = E\{I_{er}(n)I_{eq}(n+1) - I_{er}(n)I_{eq}(n-1)\}$$
$$= E\{I_{er}(n-1)I_{eq}(n) - I_{er}(n)I_{eq}(n-1)\}.$$

Thus, a decision-directed phase sensor for use in a receiver for VSB modulated signals is $$I_{er}(n-1)I_{eq}(n) - I_{er}(n)I_{eq}(n-1). \tag{5}$$

Such a phase sensor may be used in timing recovery for QAM signals as well as for phase recovery of VSB modulated signals. The phase sensor described by Equation 5, however, may have degraded performance when close echo signals are present. In the context of the present discussion, "close echo signals" are echoes who distance from the main (e.g., strongest) signal is less than ten sampling intervals of the input signal; in some embodiments and for some types of signals close echo signals are those that displaced from the main signal by less than five sampling intervals of the input signal. Existing phase sensors that utilize this approximation may interpret a close channel tap as a phase error and may, therefore, perform an erroneous correction.

In some embodiments, a more accurate estimation for $Q_{eq}$ may be obtained by using higher order terms in Equation 4. As described further below, in some embodiments additional approximations may also be used to reduce and/or eliminate the corresponding delay. A more accurate estimation for $Q_{eq}$ may improve the performance of the phase sensor and, thus, may provide improved estimates of a phase offset that may be used to reduce and/or eliminate a phase error in a communication system that includes a transmitter, a communication channel and the receiver. Higher order estimation for $Q_{eq}$ may be more immune to close echoes.

In an exemplary embodiment, 4th order terms in Equation 4 are used. $Q_{eq}$ may be expressed as $$Q_{eq} \approx \frac{2}{\pi}(I_{eq}(n-1) - I_{eq}(n+1)) + \frac{2}{3\pi}(I_{eq}(n-3) - I_{eq}(n+3)) + \frac{2}{5\pi}(I_{eq}(n-5) - I_{eq}(n+5)) + \frac{2}{7\pi}(I_{eq}(n-7) - I_{eq}(n+7)).$$

In order to eliminate the delay that occurs when generating $Q_{eq}$, the terms that include the future samples of $I_{eq}$ (e.g., the n+1, n+3, n+5 and n+7 terms in the equation, above) may be replaced by terms that include past samples of the error signal $I_{er}$. Thus, $$E\{-I_{er}Q_{eq}\} \approx -\frac{2}{\pi}E\{I_{er}(n-1)I_{eq}(n) - I_{er}(n)I_{eq}(n-1)) + \frac{1}{3}(I_{er}(n-3)I_{eq}(n) - I_{er}(n)I_{eq}(n-3)) +$$

-continued $$\frac{1}{5}(I_{er}(n-5)I_{eq}(n) - I_{er}(n)I_{eq}(n-5)) +$$

$$\frac{1}{7}(I_{er}(n-7)I_{eq}(n) - I_{er}(n)I_{eq}(n-7))\}.$$

An embodiment of an improved phase sensor may be defined, therefore, as $$-\frac{2}{\pi}(I_{er}(n-1)I_{eq}(n) - I_{er}(n)I_{eq}(n-1)) - \qquad (6)$$

$$\frac{2}{3\pi}(I_{er}(n-3)I_{eq}(n) - I_{er}(n)I_{eq}(n-3)) -$$

$$\frac{2}{5\pi}(I_{er}(n-5)I_{eq}(n) - I_{er}(n)I_{eq}(n-5)) -$$

$$\frac{2}{7\pi}(I_{er}(n-7)I_{eq}(n) - I_{er}(n)I_{eq}(n-7)).$$

In another embodiment, the weights in Equation 6 may be simplified as $$-15(I_{er}(n-1)I_{eq}(n) - I_{er}(n)I_{eq}(n-1)) - \qquad (7)$$

$$5(I_{er}(n-3)I_{eq}(n) - I_{er}(n)I_{eq}(n-3)) -$$

$$3(I_{er}(n-5)I_{eq}(n) - I_{er}(n)I_{eq}(n-5)) -$$

$$\frac{15}{7}(I_{er}(n-7)I_{eq}(n) - I_{er}(n)I_{eq}(n-7)).$$

In another embodiment, the weights in Equation 7 may be simplified as $$-15(I_{er}(n-1)I_{eq}(n) - I_{er}(n)I_{eq}(n-1))$$

$$-5(I_{er}(n-3)I_{eq}(n) - I_{er}(n)I_{eq}(n-3))$$

$$-3(I_{er}(n-5)I_{eq}(n) - I_{er}(n)I_{eq}(n-5))$$

$$-2(I_{er}(n-7)I_{eq}(n) - I_{er}(n)I_{eq}(n-7)). \qquad (8)$$

A general expression for these, and other related embodiments, is $$A_1[I_{er}(n-1)I_{eq}(n) - I_{er}(n)I_{eq}(n-1)] + A_3[I_{er}(n-3)I_{eq}(n) - I_{er}(n)I_{eq}(n-3)] + A_5[I_{er}(n-5)I_{eq}(n) - I_{er}(n)I_{eq}(n-5)] + A_7[I_{er}(n-7)I_{eq}(n) - I_{er}(n)I_{eq}(n-7)], \qquad (9)$$

where $A_1$, $A_3$, $A_5$, $A_7$ (and more generally, $A_{2n-1}$) are coefficients.

In another embodiment, Equations 7, 8 and/or 9 may be modified by replacing $I_{eq}$ with the signum function of $I_{eq}$, $S\{I_{eq}\}=\text{sign }\{I_{eq}\}$. Using Equation 8 as an illustrative example, this substitution yields $$-15(I_{er}(n-1)S\{I_{eq}(n)\} - I_{er}(n)S\{I_{eq}(n-1)\})$$

$$-5(I_{er}(n-3)S\{I_{eq}(n)\} - I_{er}(n)S\{I_{eq}(n-3)\})$$

$$-3(I_{er}(n-5)S\{I_{eq}(n)\} - I_{er}(n)S\{I_{eq}(n-5)\})$$

$$-2(I_{er}(n-7)S\{I_{eq}(n)\} - I_{er}(n)S\{I_{eq}(n-7)\}). \qquad (10)$$

Attention is now directed towards embodiments of a receiver that address the difficulties associated with existing approaches to receiving modulated signals, such as VSB modulated signals. FIG. 1 is a block diagram illustrating an embodiment of a receiver 100. The receiver 100 includes a demodulator 112, an equalizer 120, a decision-directed phase sensor/controller 134, and a non-decision directed phase sensor/controller 118. An input signal 110 is coupled to the demodulator 112. The input signal 110 may be transmitted by a transmitter (not shown) and conveyed by a communication channel or path (not shown) to the receiver 100. The input signal 110 may be VSB modulated. For example, the input signal 110 may be modulated at an intermediate carrier frequency. The input signal 110 is filtered by a filter 114. In some embodiments, the filter 114 is a matched filter. Non-decision-directed phase correction may be implemented using multiplier 116-1. The phase correction may be in accordance with a phase correction value provided by the phase sensor/controller 118. It may be noted that in the embodiments described here, input signal 110 is a sampled digital signal, and the demodulator 112 and equalizer 120 are digital signal processing circuits. The input signal 110 is sampled at an appropriate rate, which may be based on symbol rate of the symbols in the input signal and/or the maximum frequency at which the input signal contains useful information. In one embodiment, where the symbol rate is 5 MHz, the input signal is sampled at a rate of approximately 10 MHz.

The demodulator 112 may output a first equalized version of an in-phase component of the input signal 110 and/or a first equalized version of an out-of-phase component of the input signal 110. The in-phase and out-of-phase components of the input signal 110 may be in quadrature. The output from the demodulator 112 may be filtered by filter 122 in the equalizer 120 resulting in a second equalized version of the in-phase component of the input signal 110 and/or a second equalized version of the out-of-phase component of the input signal 110. While the filter 122 in the embodiments described above is a finite impulse response (FIR) filter, in other embodiments the filter 122 may be an infinite impulse response (IIR) filter.

The equalizer 120 may further include a detector 128. In some embodiments, the detector 128 is a threshold or slicer (also referred to as a hard slicer), which performs bit-by-bit detection. In some embodiments, the detector 128 is a maximum likelihood detector, such as a Viterbi detector. The detector 128 may determine the in-phase component of the time sequence of symbols $x_i$. Symbols $x_i$ may be coupled to a decision feedback equalizer (DFE) 130 and summed, using summation 124, with a phase corrected version of the second equalized version of the in-phase component of the input signal 110 and/or a phase corrected version of the second equalized version of the out-of-phase component of the input signal 110, which is output from multiplier 116-2. An output from the summation is equalized in-phase signal $I_{eq}$ 126.

The in-phase signal $I_{eq}$ 126 is used as an input to the detector 128. In addition, the in-phase signal $I_{eq}$ 126 is input to difference circuit 132 and phase sensor/controller 134. The difference circuit 132 outputs a difference of $x_i$ and the in-phase signal $I_{eq}$ 126 to the phase sensor/controller 134. This difference is the error signal $I_{er}$ discussed previously. The phase sensor/controller 134 uses these inputs to determine a decision-directed phase correction value, which is implemented using the multiplier 116-2.

Figure 2:
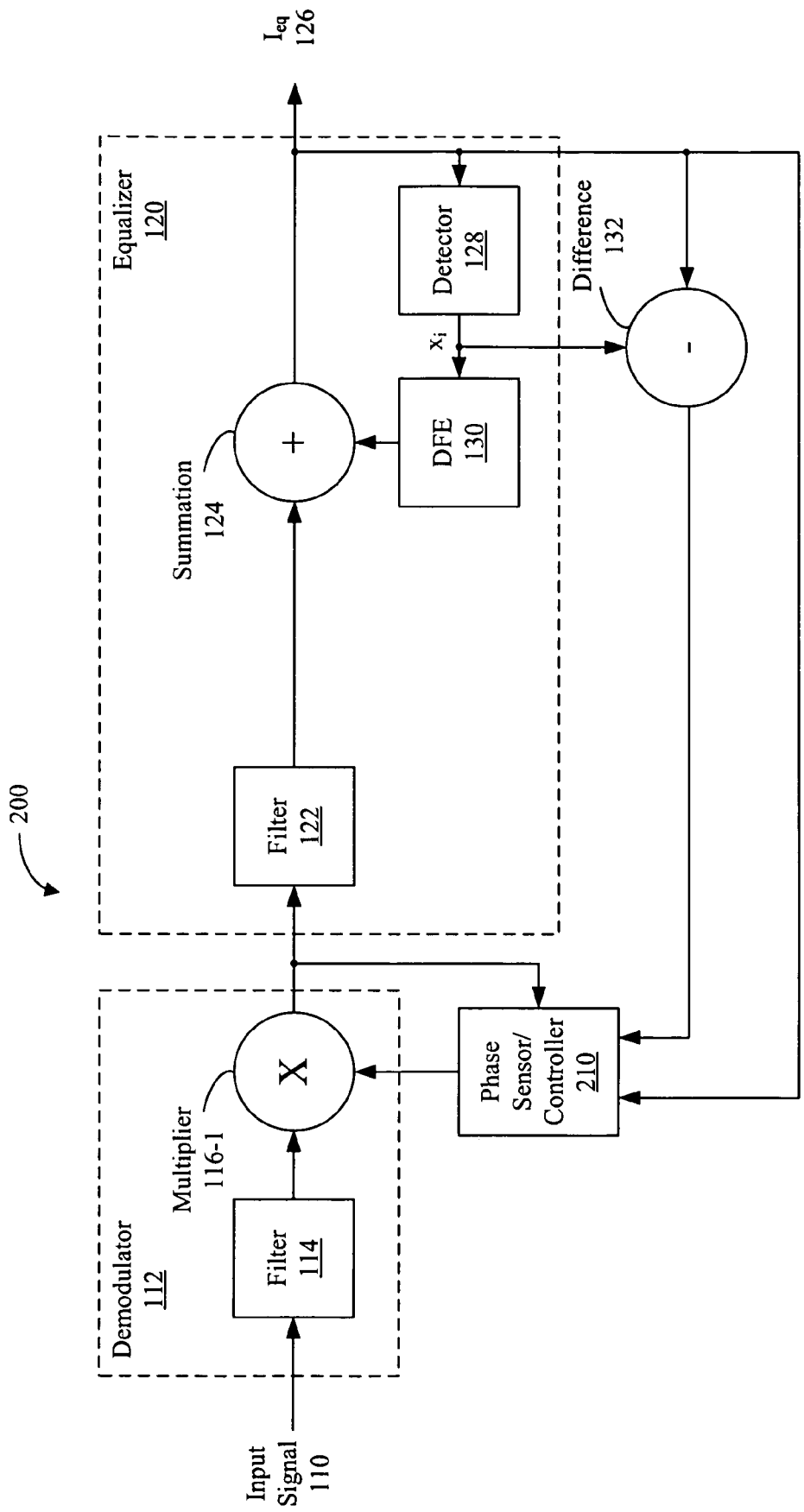
FIG. 2 is a block diagram illustrating an embodiment of a receiver.

In some embodiments, the receiver 100 may include fewer or additional components. The logical positions of one or more components may be changed. Two or more components may be combined into a single component. This is illustrated in FIG. 2, which is a block diagram illustrating an embodiment of a receiver 200. In the receiver 200, the phase sensor/controller 134 has been combined with the phase sensor/controller 118 into phase sensor/controller 210. Thus, in the receiver 200, the non-decision directed phase error sensing and correction has been eliminated.

In exemplary embodiments, the phase sensor/controller 134 (FIG. 1) and/or the phase sensor/controller 210 may implement one or more embodiments of phase sensors for determining estimates of $Q_{eq}$ such as those described in Equations 6-10. Other embodiments may include fewer or more terms, i.e., up to an order k, in Equation 4. In some embodiments, the order k is greater than 1. These embodiments of the receiver 100 (FIG. 1) and/or the receiver 200 may offer improved performance in the presence of echo signals while reducing and/or eliminating the delays associated with implementing a phase sensor in a phase recovery loop. In addition, these embodiments may reduce a complexity and/or a cost of the receiver 100 (FIG. 1) and/or the receiver 200.

Figure 3:
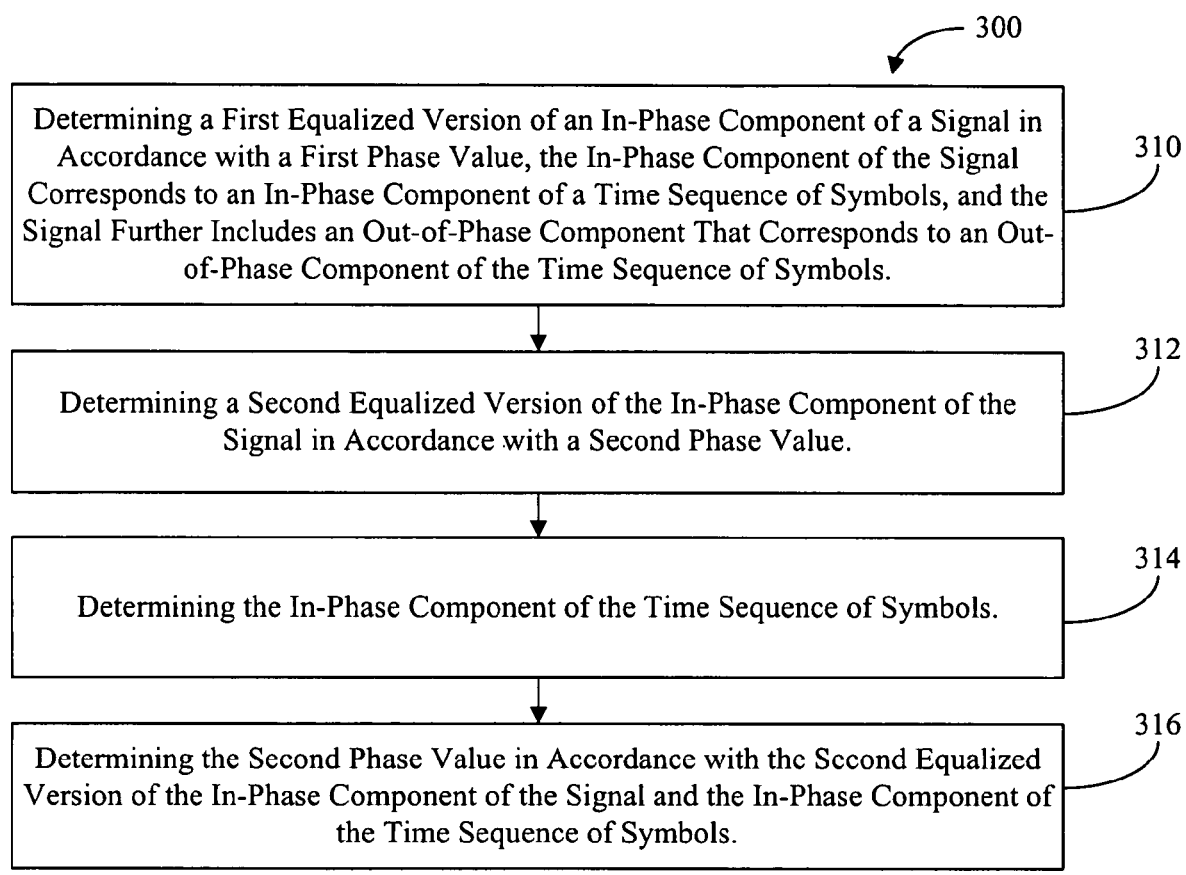
FIG. 3 is a flow diagram illustrating an embodiment of a method of operation of a receiver.

Attention is now directed towards method of using receivers that have a decision-directed equalizer. FIG. 3 is a flow diagram illustrating an embodiment of a method 300 of operation of a receiver. A first equalized version of an in-phase component of a signal is determined in accordance with a first phase value (310). The in-phase component of the signal corresponds to an in-phase component of a time sequence of symbols. The signal may further include an out-of-phase component that corresponds to an out-of-phase component of the time sequence of symbols. A second equalized version of the in-phase component of the signal is determined in accordance with a second phase value (312). The in-phase component of the time sequence of symbols is determined (314). The second phase value is determined in accordance with the second equalized version of the in-phase component of the signal and the in-phase component of the time sequence of symbols (316). In some embodiments, there may be fewer or additional operations, an order of the operations may be rearranged and/or two or more operations may be combined.

Figure 4:
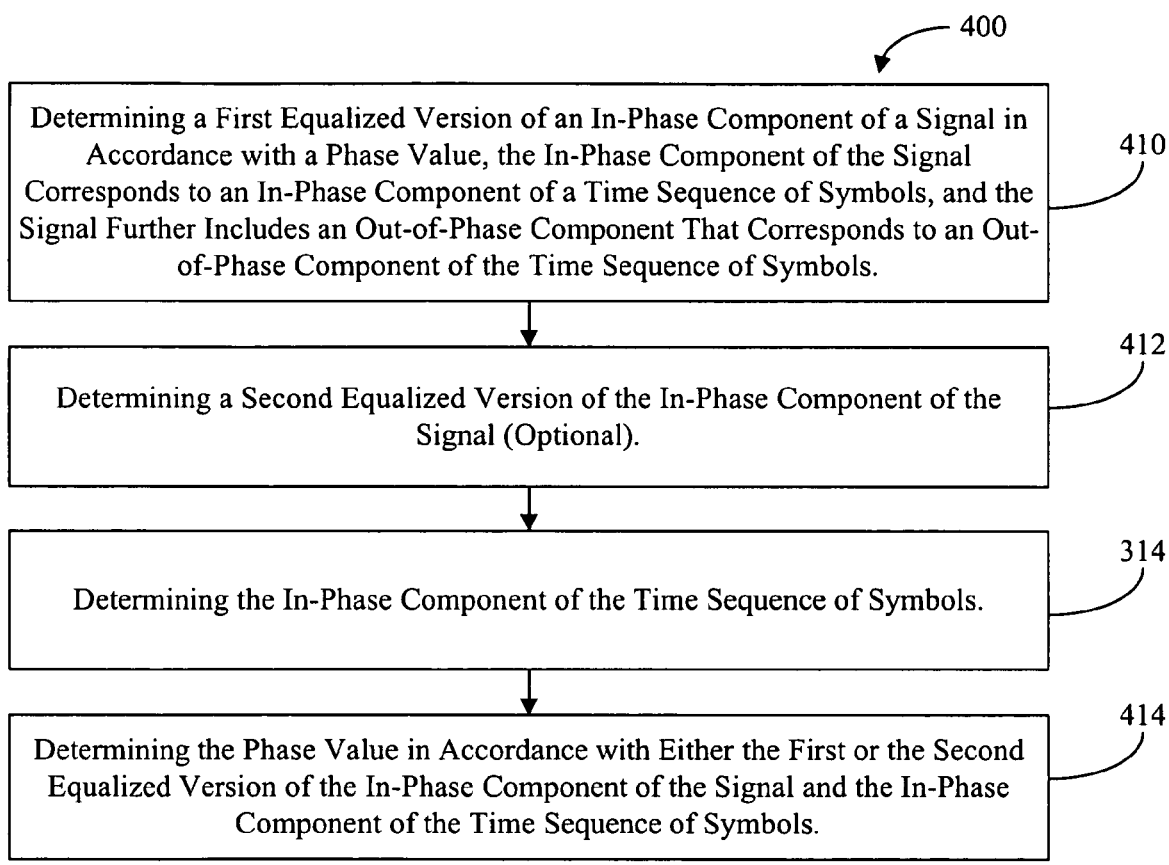
FIG. 4 is a flow diagram illustrating an embodiment of a method of operation of a receiver.

FIG. 4 is a flow diagram illustrating an embodiment of a method 400 of operation of a receiver. A first equalized version of an in-phase component of a signal is determined in accordance with a phase value (410). The in-phase component of the signal corresponds to an in-phase component of a time sequence of symbols. The signal may further include an out-of-phase component that corresponds to an out-of-phase component of the time sequence of symbols. A second equalized version of the in-phase component of the signal is optionally determined (412). The in-phase component of the time sequence of symbols is determined (314). The phase value is determined in accordance with either the first or the second equalized version of the in-phase component of the signal and the in-phase component of the time sequence of symbols (414). In some embodiments, there may be fewer or additional operations, an order of the operations may be rearranged and/or two or more operations may be combined.

Devices and circuits described herein can be implemented using computer aided design tools available in the art, and embodied by computer readable files containing software descriptions of such circuits, at behavioral, register transfer, logic component, transistor and layout geometry level descriptions stored on storage media or communicated by carrier waves. Data formats in which such descriptions can be implemented include, but are not limited to, formats supporting behavioral languages like C, formats supporting register transfer level RTL languages like Verilog and VHDL, and formats supporting geometry description languages like GDSII, GDSIII, GDSIV, CIF, MEBES and other suitable formats and languages. Data transfers of such files on machine readable media including carrier waves can be done electronically over the diverse media on the Internet or through email, for example. Physical files can be implemented on machine readable media such as 4 mm magnetic tape, 8 mm magnetic tape, 3½ inch floppy media, CDs, DVDs and so on.

Figure 5:
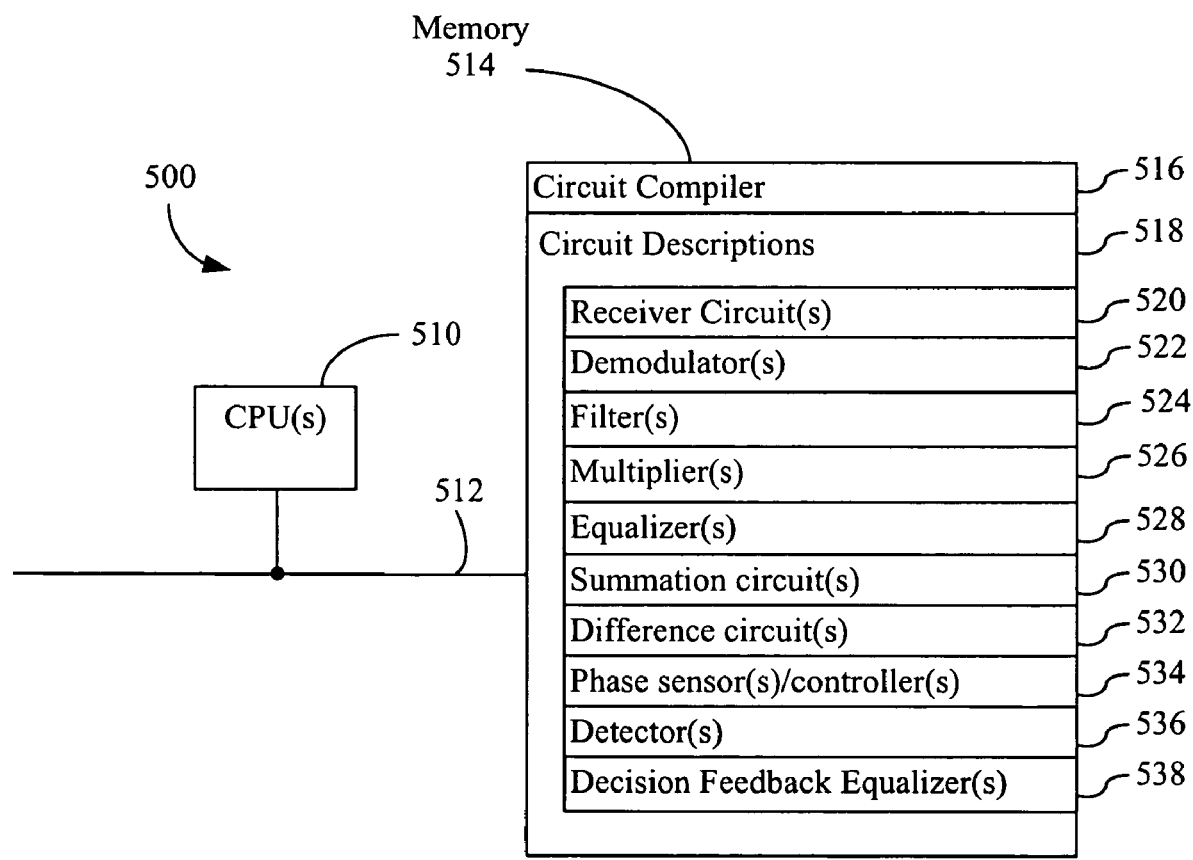
FIG. 5 is a block diagram illustrating an embodiment of a system.

FIG. 5 is a block diagram of an embodiment of a system 500 for storing computer readable files containing software descriptions of the circuits. The system 500 may include at least one data processor or central processing unit (CPU) 510, memory 514 and one or more signal lines or communication buses 512 for coupling these components to one another. Memory 514 may include high-speed random access memory and/or non-volatile memory, such as one or more magnetic disk storage devices. Memory 514, or alternatively one or more storage devices (e.g., one or more nonvolatile storage devices) within memory 514, includes a computer readable storage medium. Memory 514, or the computer readable medium of memory 514, may store a circuit compiler 516 and circuit descriptions 518. Circuit descriptions 518 may include circuit descriptions for one or more receiver circuits 520, one or more demodulators 522, one or more filters 524, one or more multipliers 526, one or more equalizers 528, one or more summation circuits 530, one or more difference circuits 532, one or more phase sensors/controllers 534, one or more detectors 536, and/or one or more decision feedback equalizers 538.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A circuit, comprising:
  a demodulator configured to receive a signal, including an in-phase component of the signal that corresponds to an in-phase component of a time sequence of symbols and an out-of-phase component of the signal that corresponds to an out-of-phase component of the time sequence of symbols, and to output a first equalized version of the in-phase component of the signal in accordance with a first phase value;
  an equalizer coupled to the demodulator, wherein the equalizer is configured to determine a second equalized version of the in-phase component of the signal in accordance with a second phase value and to determine the in-phase component of the time sequence of symbols; and
  a first phase sensor coupled to the equalizer,
  wherein the first phase sensor is configured to determine the second phase value in accordance with the second equalized version of the in-phase component of the signal and the in-phase component of the time sequence of symbols, the first phase sensor is further configured to generate an approximation to the out-of-phase component of the signal in accordance with a Hilbert function of order k greater than 1, and wherein terms in the approximation to the out-of-phase component of the signal that correspond to future samples of the in-phase component of the signal are replaced with terms that correspond to past samples of an error that corresponds to a difference between samples of the in-phase component of the signal and an output from a detector.

2. The circuit of claim 1, wherein the second phase value is in accordance with a difference between the second equalized version of the in-phase component of the signal and the output from the detector.

3. The circuit of claim 1, wherein the approximation to the out-of-phase component of the signal is generated in accordance with $$A_1[I_{er}(n-1)I_{eq}(n)-I_{er}(n)I_{eq}(n-1)]+A_3[I_{er}(n-3)I_{eq}(n)-I_{er}(n)I_{eq}(n-3)]+A_5[I_{er}(n-5)I_{eq}(n)-I_{er}(n)I_{eq}(n-5)]+A_7[I_{er}(n-7)I_{eq}(n)-I_{er}(n)I_{eq}(n-7)],$$

wherein $I(n)$ is the nth sample of the in-phase component of the signal, $A_{2n-1}$ is a coefficient, and $I_{er}=I(n)-D\{I(n)\}$ and $D\{I(n)\}$ is a detector output.

4. The circuit of claim 1, wherein the phase sensor is further configured to generate a signum function of the second equalized version of the in-phase component of the signal.

5. The circuit of claim 1, wherein a magnitude of a phase difference between the out-of-phase component of the signal and the in-phase component of the signal is approximately 90°.

6. The circuit of claim 1, wherein the signal includes one or more multi-path signals.

7. The circuit of claim 1, further comprising a second phase sensor configured to determine the first phase value in accordance with the first equalized version of the in-phase component of the signal.

8. The circuit of claim 1, wherein the signal is vestigial side band (VSB) modulated.

9. The circuit of claim 1, wherein the demodulator is further configured to output a first equalized version of the out-of-phase component of the signal in accordance with the first phase value.

10. The circuit of claim 1, wherein the equalizer is configured to determine the in-phase component of the time sequence of symbols using decision feedback equalization and a maximum likelihood detector.

11. A method, comprising:

in a receiver circuit:

determining a first equalized version of an in-phase component of a signal in accordance with a first phase value, wherein the in-phase component of the signal corresponds to an in-phase component of a time sequence of symbols, and wherein the signal further includes an out-of-phase component that corresponds to an out-of-phase component of the time sequence of symbols;

determining a second equalized version of the in-phase component of the signal in accordance with a second phase value;

determining the in-phase component of the time sequence of symbols, determining the second phase value in accordance with the second equalized version of the in-phase component of the signal and the in-phase component of the time sequence of symbols; and generating an approximation to the out-of-phase component of the signal in accordance with a Hilbert function of order k greater than 1, wherein terms in the approximation to the out-of-phase component of the signal that correspond to future samples of the in-phase component of the signal are replaced with terms that correspond to past samples of an error that corresponds to a difference between samples of the in-phase component of the signal and an output from a detector.

12. The method of claim 11, wherein the second phase value is in accordance with a difference between the second equalized version of the in-phase component of the signal and the output from the detector.

13. The method of claim 11, the approximation to the out-of-phase component of the signal is generated in accordance with $$A_1[I_{er}(n-1)I_{eq}(n)-I_{er}(n)I_{eq}(n-1)]+A_3[I_{er}(n-3)I_{eq}(n)-I_{er}(n)I_{eq}(n-3)]+A_5[I_{er}(n-5)I_{eq}(n)-I_{er}(n)I_{eq}(n-5)]+A_7[I_{er}(n-7)I_{eq}(n)-I_{er}(n)I_{eq}(n-7)],$$

wherein $I(n)$ is the nth sample of the in-phase component of the signal, $A_{2n-1}$ is a coefficient, and $I_{er}=I(n)-D\{I(n)\}$ and $D\{I(n)\}$ is a detector output.

14. The method of claim 11, further comprising generating a signum function of the second equalized version of the in-phase component of the signal.

15. The method of claim 11, wherein a magnitude of a phase difference between the out-of-phase component of the signal and the in-phase component of the signal is approximately 90°.

16. The method of claim 11, wherein the signal includes one or more multi-path signals.

17. The method of claim 11, further comprising determining the first phase value in accordance with the first equalized version of the in-phase component of the signal.

18. The method of claim 11, wherein the signal is vestigial side band (VSB) modulated.

19. The method of claim 11, further comprising determining a first equalized version of the out-of-phase component of the signal in accordance with the first phase value.

20. The method of claim 11, wherein the determining the in-phase component of the time sequence of symbols utilizes decision feedback equalization and a maximum likelihood detector.

21. A circuit, comprising:

first means for determining a first equalized version of an in-phase component of a signal in accordance with a first phase value, wherein the in-phase component of the signal corresponds to an in-phase component of a time sequence of symbols, and wherein the signal further includes an out-of-phase component that corresponds to an out-of-phase component of the time sequence of symbols;

second means, coupled the first means, for determining a second equalized version of the in-phase component of the signal in accordance with a second phase value and for determining the in-phase component of the time sequence of symbols; and third means, coupled to the second means, for determining the second phase value in accordance with the second equalized version of the in-phase component of the signal and the in-phase component of the time sequence of symbols, the third means further for generating an approximation to the out-of-phase component of the signal in accordance with a Hilbert function of order k greater than 1, wherein terms in the approximation to the out-of-phase component of the signal that correspond to future samples of the in-phase component of the signal are replaced with terms that correspond to past samples of an error that corresponds to a difference between samples of the in-phase component of the signal and an output from a detector.

22. A computer readable medium containing data representing a circuit that includes:

a demodulator configured to receive a signal, including an in-phase component of the signal that corresponds to an in-phase component of a time sequence of symbols and an out-of-phase component of the signal that corresponds to an out-of-phase component of the time sequence of symbols, and to output a first equalized version of the in-phase component of the signal in accordance with a first phase value;

an equalizer coupled to the demodulator, wherein the equalizer is configured to determine a second equalized version of the in-phase component of the signal in accordance with a second phase value and to determine the in-phase component of the time sequence of symbols; and a first phase sensor coupled to the equalizer, wherein the first phase sensor is configured to determine the second phase value in accordance with the second equalized version of the in-phase component of the signal and the in-phase component of the time sequence of symbols, the first phase sensor is further configured to generate an approximation to the out-of-phase component of the signal in accordance with a Hilbert function of order k greater than 1, terms in the approximation to the out-of-phase component of the signal that correspond to future samples of the in-phase component of the signal are replaced with terms that correspond to past samples of an error that corresponds to a difference between samples of the in-phase component of the signal and an output from a detector.

23. A circuit, comprising:

a demodulator configured to receive a signal, including an in-phase component of the signal that corresponds to an in-phase component of a time sequence of symbols and an out-of-phase component of the signal that corresponds to an out-of-phase component of the time sequence of symbols, and to output a first equalized version of the in-phase component of the signal in accordance with a phase value;

an equalizer coupled to the demodulator, wherein the equalizer is configured to determine a second equalized version of the in-phase component of the signal and to determine the in-phase component of the time sequence of symbols; and a phase sensor coupled to the equalizer, wherein the phase sensor is configured to determine the phase value in accordance with the second equalized version of the in-phase component of the signal and the in-phase component of the time sequence of symbols, the phase sensor is further configured to generate an approximation to the out-of-phase component of the signal in accordance with a Hilbert function of order k greater than 1, terms in the approximation to the out-of-phase component of the signal that correspond to future samples of the in-phase component of the signal are replaced with terms that correspond to past samples of an error that corresponds to a difference between samples of the in-phase component of the signal and an output from a detector.

* * * * *

UNITED STATES PATENT AND TRADEMARK OFFICE
CERTIFICATE OF CORRECTION

PATENT NO. : 7,616,684 B2
APPLICATION NO. : 11/392302
DATED : November 10, 2009
INVENTOR(S) : Cohen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Nineteenth Day of October, 2010

David J. Kappos
*Director of the United States Patent and Trademark Office*